US007609968B2

(12) United States Patent
Lee et al.

(10) Patent No.: US 7,609,968 B2
(45) **Date of Patent: *Oct. 27, 2009**

(54) SECURE ANALOG COMMUNICATION SYSTEM USING TIME AND WAVELENGTH SCRAMBLING

(75) Inventors: Michael Lee, Ottawa (CA); Roberto Faria, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 598 days.

This patent is subject to a terminal disclaimer.

(21) Appl. No.: 11/153,650

(22) Filed: Jun. 15, 2005

(65) Prior Publication Data

US 2006/0285848 A1 Dec. 21, 2006

(51) Int. Cl.
*H04J 14/02* (2006.01)

(52) U.S. Cl. ........................................ 398/79; 398/48

(58) Field of Classification Search .................. 398/77, 398/78, 48, 79
See application file for complete search history.

(56) References Cited

U.S. PATENT DOCUMENTS 4,276,652 A * 6/1981 McCalmont et al. .......... 380/34
7,272,319 B1 * 9/2007 Piccirilli et al. ............... 398/89
2004/0042796 A1 * 3/2004 Con-Carolis et al. .......... 398/83
2004/0081471 A1 4/2004 Lee
2006/0245470 A1 * 11/2006 Balachandran et al. ...... 375/133

OTHER PUBLICATIONS

Prasad, R. and T. Ojanpera. "A survey on CDMA: evolution towards wideband CDMA." IEEE 5th International Symposium on Spread Spectrum Techniques and Applications, 1998. Proceedings., Sep. 2-4, 1998: 323-331, vol. 1.*

Chan, H. et al. "Streaming encryption for a secure wavelength and time domain hopped optical network." International Conference on Information Technology: Coding and Computing, 2004. Proceedings. ITCC 2004. Apr. 5-7, 2004: 578-582, vol. 2.*

Davis, P. et al. "Chaotic wavelength-hopping device for multiwavelength optical communications." IEEE Transactions on Circuits and Systems I: Fundamental Theory and Applications, vol. 48, No. 12, Dec. 2001: 1523-1527.*

* cited by examiner

*Primary Examiner*—Leslie Pascal
(74) *Attorney, Agent, or Firm*—Guerin & Rodriguez, LLP; William G. Guerin

(57) ABSTRACT

Described are a secure communications system and method for transmitting analog signals. The secure communications system includes an analog multiplexer, an analog demultiplexer, a plurality of analog communications channels each at a different wavelength, and a pair of sequence logic modules. Analog signals applied to the analog multiplexer are scrambled onto the multiple communications channels. The demultiplexer descrambles the transmitted scrambled signals to reproduce the original analog signals. The sequence logic modules provide a channel selection signal to implement synchronous pseudorandom switching of the analog signals amongst the analog communication channels. The sequence of the switching between analog communications channels can be pseudorandom in sequence and in time. The channel selection signal is responsive to a key shared between the sequence logic modules. An attacker having access to the analog communications channels cannot retrieve the original analog signals without access to the shared key.

6 Claims, 5 Drawing Sheets

| WAVELENGTH | INTERVAL 1 | INTERVAL 2 | INTERVAL 3 | INTERVAL 4 |
|---|---|---|---|---|
| $\lambda_1$ | ESIG 1 | ESIG 3 | ESIG 1 | ESIG 2 |
| $\lambda_2$ | ESIG 2 | ESIG 1 | ESIG 3 | ESIG 4 |
| $\lambda_3$ | ESIG 3 | ESIG 2 | ESIG 4 | ESIG 3 |
| $\lambda_4$ | ESIG 4 | ESIG 4 | ESIG 2 | ESIG 1 |

SECURE ANALOG COMMUNICATION SYSTEM USING TIME AND WAVELENGTH SCRAMBLING

FIELD OF THE INVENTION

The invention relates generally to communications systems for secure transmission of analog signals. More particularly, the invention relates to an analog optical system using non-predictable time and wavelength scrambling to preserve the confidentiality of transmitted signals.

BACKGROUND OF THE INVENTION

Transmission of signals over optical fiber has become more common in part due to high signal capacity of the fiber. For example, dense wavelength division multiplexing (DWDM) systems use multiple optical wavelengths to transmit a large number of signals over a single optical fiber. Long haul optical systems allow transmission over large distances to provide signals to geographically remote locations. High value analog channels such as premium cable channels and pay-per-view can be distributed by cable providers to subscriber locations over such systems by analog modulation of the optical carriers at the different wavelengths. No digitization of the analog signals is required. Security measures are generally not employed and the opportunity for theft of the analog signals is significant.

Physical access to the optical fiber at any point along its length allows a motivated attacker to tap the fiber and eavesdrop on the transmitted channels. To tap the optical fiber, the attacker removes at least some of the cladding and bends the fiber to gain access to a portion of the optical signals that escape through the disturbed cladding. If the optical power of the tapped optical signals is sufficient, an optical receiver and associated optical and electronic components can be used to capture, or copy, a transmitted optical signal. Moreover, depending on the complexity of the equipment used by the intruder, multiple channels can be stolen. If the tapped optical signal power is small relative to the total optical signal power, subscribers are unaffected and the distribution company cannot readily detect the theft. Long haul systems are particularly vulnerable as the optical fiber length provides more opportunity for physical access.

Mechanisms currently exist to protect analog signals for transmission over an optical fiber. The analog signal can be digitized and conventional encryption techniques can be applied to the resulting data stream. Conventional encryption technology includes the use of encryption protocols such as advanced encryption standard (AES) and digital encryption standard (DES or triple-DES). Encryption protocols are generally complex and require significant processing power. Moreover, extensive hardware is required because the analog signals are converted from analog to digital format and encrypted at the transmitter and then converted from digital to analog format and decrypted at the receiver. This complexity eliminates the current advantage of simplicity and low cost enjoyed by a pure analog optical distribution scheme.

What is needed is a method for preserving the confidentiality of analog optical signals without using complex processing and expensive hardware. The present invention satisfies this need and provides additional advantages.

SUMMARY OF THE INVENTION

In one aspect, the invention features a secure communications system for transmitting a plurality of analog signals. The communications system includes a plurality of analog communications channels each adapted to conduct an analog modulation of a respective one of a plurality of carrier signals. Each carrier signal has a unique frequency. The communications system also includes an analog multiplexer, an analog demultiplexer, a first sequence logic module and a second logic sequence module. The analog multiplexer has a plurality of multiplexer input terminals each accepting one of the analog signals and a plurality of multiplexer output terminals each in communication with one of the communications channels. The analog demultiplexer has a plurality of demultiplexer input terminals each in communication with one of the communications channels and a plurality of demultiplexer output terminals. The first sequence logic module communicates with the analog multiplexer to provide a channel selection signal responsive to a shared key. The second sequence logic module communicates with the analog demultiplexer to provide the channel selection signal. The channel selection signal controls the switching of the multiplexer input terminals to the multiplexer output terminals and the switching of the demultiplexer input terminals to the demultiplexer output terminals. Each analog signal provided at one of the multiplexer input terminals is reproduced at a respective one of the demultiplexer output terminals.

In another aspect, the invention features a secure optical communications system for transmitting a plurality of analog signals. The optical communications system includes an optical link having a plurality of transmitters at a first end and a plurality of receivers at a second end. Each transmitter is configured to generate an analog optical signal at a respective one of a plurality of wavelengths in response to an analog electrical signal. Each receiver is adapted to detect one of the analog optical signals at the respective wavelength. The optical communications system also includes an analog multiplexer, an analog demultiplexer, a first sequence logic module and a second logic sequence module. The analog multiplexer has a plurality of multiplexer input terminals to accept one of the analog electrical signals and a plurality of multiplexer output terminals each in communication with one of the transmitters. The analog demultiplexer has a plurality of demultiplexer input terminals each in communication with one of the receivers and a plurality of demultiplexer output terminals. The first sequence logic module communicates with the analog multiplexer to provide a channel selection signal responsive to a shared key. The second sequence logic module communicates with the analog demultiplexer to provide the channel selection signal. The channel selection signal controls the switching of the multiplexer input terminals to the multiplexer output terminals and the switching of the demultiplexer input terminals to the demultiplexer output terminals. Each analog electrical signal provided at one of the multiplexer input terminals is reproduced at a respective one of the demultiplexer output terminals.

In yet another aspect, the invention features a method for transmitting analog optical signals in a wavelength division multiplexing optical system. Portions of analog signals from a plurality of analog signals are selectively combined over a plurality of optical channels in accordance with a channel selection signal. Each optical channel has a unique wavelength. The channel selection signal is defined by a shared key. The combined portions of analog signals are transmitted and detected for each optical channel. The detected portions of analog signals are selectively combined in accordance with the channel selection signal to reproduce the analog signals.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview the present invention relates to a secure communications system for transmitting analog signals. The analog signals are scrambled over multiple carrier signals. Each carrier signal has a unique frequency. The carrier sequence and the time period during which each analog signal is applied to a carrier signal are non-predictable. A secret key used at the transmit end of the transmission media sets the scrambling algorithm sequence. The analog signals are recovered at the receive end of the transmission media using the same secret key. An attacker attempting to tap the analog signals does not have possession of the specific key. Consequently, the attacker cannot recover the analog signals.

Figure 1:
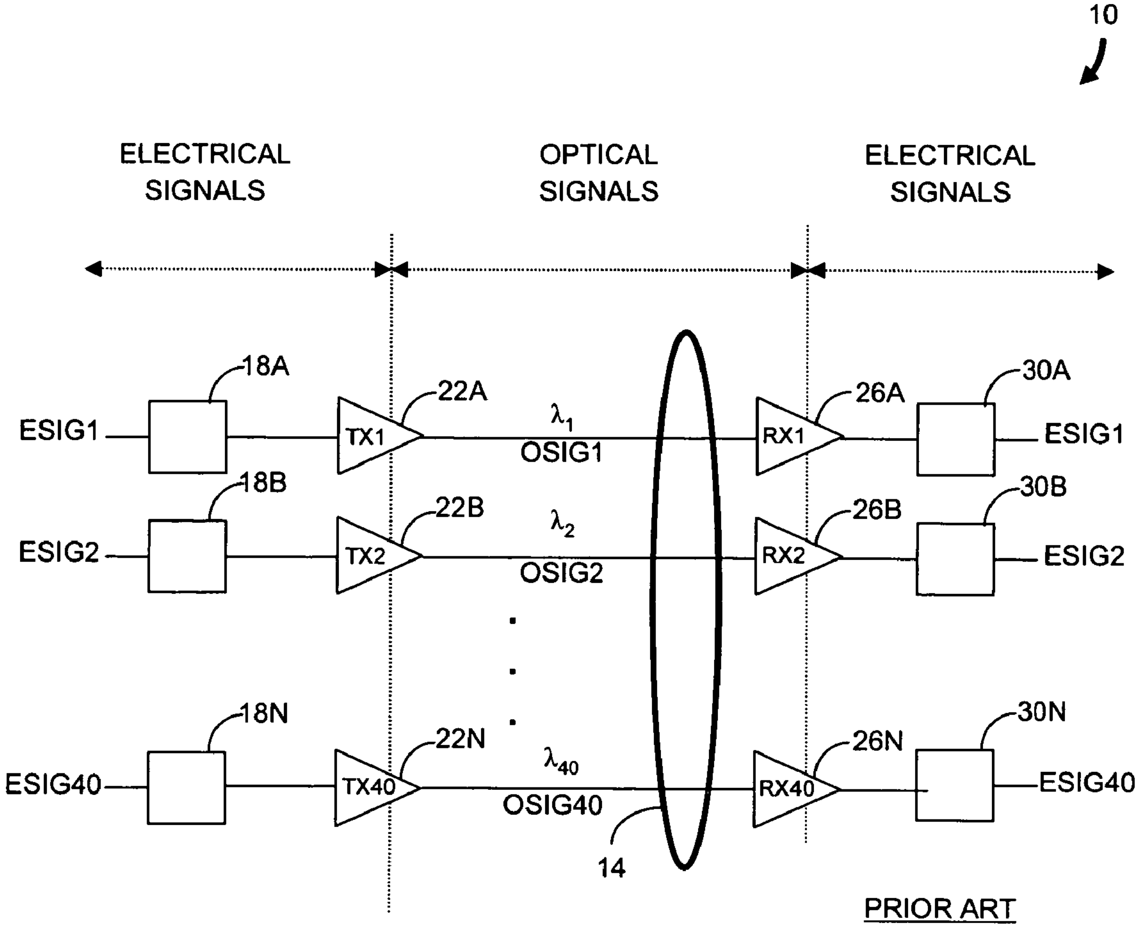
FIG. 1 is a block diagram of a conventional DWDM optical system for transmitting analog signals using multiple optical wavelengths.

Referring to FIG. 1, a dense wavelength division multiplexing (DWDM) optical system 10 transmits multiple analog signals over a single optical fiber 14. The analog electrical signals ESIG1 to ESIG40 (generally ESIG, only three shown for clarity) are processed by filter and level conversion modules 18, and applied to optical transmitters 22. Each transmitter 22 generates an analog optical signal OSIG for transmission across the fiber 14 at a unique wavelength λ. After transmission, each analog optical signal OSIG is detected by a corresponding receiver 26. Analog electrical signals generated by the receivers 26 are processed by receiver filter and level conversion modules 30 to reproduce the respective electrical analog signals ESIG. In this configuration each wavelength λ is used only for transmission of a single analog electrical signal ESIG after conversion to an optical signal OSIG.

In the illustrated optical system 10, an attacker having access to the optical fiber 14 can tap one or more optical signals OSIG by removing cladding and bending the fiber 14 to cause some of the optical signal power to escape. A tapped optical signal OSIG at a particular wavelength λ can be detected by positioning an optical receiver adapted for that wavelength near the bend in the fiber 14. Multiple optical signals OSIG can be tapped if optical demultiplexing hardware is used to direct optical signals OSIG at different wavelengths to corresponding detectors. If the tapped optical signal power is sufficiently low, maintenance personnel are unable to detect the intrusion and subscriber service is not affected.

Figure 2:
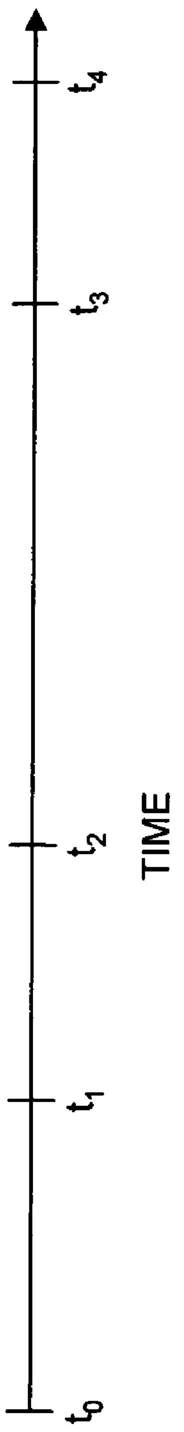
FIG. 2 is a simplified example of a time dependent scrambling of analog electrical signals over multiple wavelengths according to an embodiment of a method of the present invention.

The table of FIG. 2 provides an example of a time dependent scrambling of analog signals over a limited time according to an embodiment of a method for transmitting analog signals in accordance with the present invention. In this example, the WDM system is depicted with four optical channels, i.e., wavelengths, for simplicity. It should be recognized, however, that the invention contemplates any number of optical channels to transmit the analog signals. Moreover, the WDM channels can be based on carrier signals at non-optical wavelengths.

During time interval 1, analog electrical signals ESIG1 to ESIG4 are used to modulate optical carrier signals at wavelengths $\lambda_1$, to $\lambda_4$, respectively. With one exception, the optical carrier signal modulated by each analog electrical signal ESIG is changed at times $t_1$, $t_2$ and $t_3$. The exception includes analog electrical signal ESIG4 which continues to modulate the optical carrier signal at wavelength $\lambda_4$ for consecutive intervals 1 and 2. Similar changes in modulation of the optical carrier signals occur after time $t_4$.

According to the method, portions of the analog electrical signals that are not coincident in time (i.e., not temporally overlapping) are selectively combined in the four analog optical channels and transmitted over an optical link to a plurality of optical detectors. This selective combination, or scrambling, is performed according to a pseudorandom and non-predictable sequence such that the original analog electrical signals are securely transmitted as optical signals in the optical channels. Each optical detector generates an analog electrical signal responsive to the combined portions of the original analog optical signals ESIG transmitted in a single optical channel. Portions of the four detector-generated electrical signals are selectively combined to descramble the analog electrical signals and reproduce the original analog electrical signals ESIG.

The time interval during which each analog electrical signal ESIG modulates an optical channel varies. In the tabulated example, interval 3 has the longest duration and interval 4 has the shortest duration. The duration of subsequent time intervals (not shown) can vary in a similar manner to the depicted time intervals. The pseudorandom and non-predictable variations in duration provide an additional layer of security for the transmitted analog signals.

Figure 3:
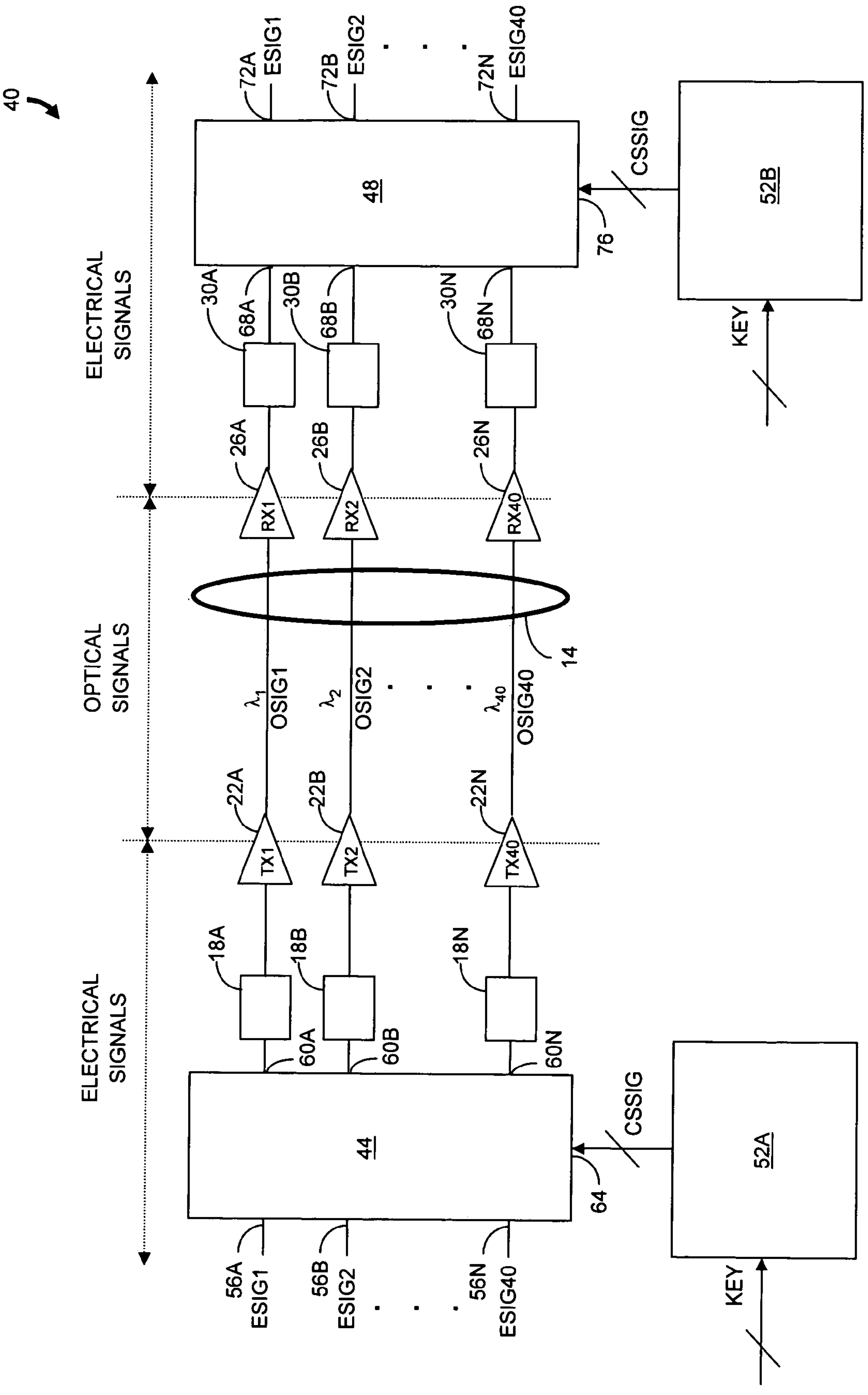
FIG. 3 is a block diagram of an embodiment of a secure DWDM optical system for transmitting analog signals in accordance with the present invention.

FIG. 3 illustrates an embodiment of a secure DWDM optical system for transmitting analog signals in accordance with the present invention. As shown, the optical system 40 has 40 optical channels although, in other embodiments, the optical system 40 has 80 channels or another number of channels. The optical system 40 includes, in addition to the components of FIG. 1, an analog multiplexer 44, an analog demultiplexer 48 and a pair of sequencer logic modules 52. The analog multiplexer 44 has a plurality of multiplexer input terminals 56, a plurality of multiplexer output terminals 60 and a control terminal 64 for communication with one of the sequencer logic modules 52A. The analog demultiplexer 48 has a plurality of demultiplexer input terminals 68, a plurality of demultiplexer output terminals 72 and a control terminal 76 for communication with the other sequencer logic module 52B.

In operation, the optical system 40 permits secure transmission of a multitude of analog signals over an optical fiber 14. Each analog electrical signal ESIG is applied to a respective one of the multiplexer input terminals 56. A channel selection signal CSSIG generated by one of the sequence logic modules 52A controls the switching (or mapping) of the analog electrical signals ESIG from the multiplexer input terminals 56 to the multiplexer output terminals 60. The switching changes over time in response to the channel selection signal CSSIG. Moreover, the time interval during which the switches remain mapped in a particular configuration also changes over time in response to the channel selection signal CSSIG.

For example, an analog electrical signal ESIG1 applied to a multiplexer input terminal 56A is routed to any one of the multiplexer output terminals 60 for a first time interval. For the duration of a next time interval, the analog electrical signal ESIG1 is routed to a different multiplexer output terminal 60. For subsequent time intervals, the analog electrical signal ESIG1 is routed to still other multiplexer output terminals 60. Over an extended time, the routing can "re-use" a multiplexer output terminal 60 that was previously mapped to the multiplexer input terminal 56A. Similar switching occurs for the other analog electrical signals ESIG applied to the other multiplexer input terminals 56B to 56N. There can also be one or more consecutive time intervals for which at least one of the analog electrical signals ESIG remains mapped to the same multiplexer output terminal 60.

The switched analog electrical signals ESIG at the multiplexer output terminals 60 are processed by the filter and level conversion modules 18, and applied to the optical transmitters 22. The analog optical signal OSIG generated by each transmitter 22 is an analog modulation of a single wavelength λ and is responsive to a particular analog electrical signal ESIG only for the duration when that analog electrical signal ESIG is coupled to the transmitter 22. Over an extended time each analog optical signal OSIG includes contributions from different analog electrical signals ESIG as determined by the channel selection signal CSSIG. Although an attacker having access to the optical fiber 14 may be able to separately detect optical signals at different wavelengths, the pseudorandom nature of the switching in space and in time prevents the attacker from retrieving the analog electrical signals ESIG from the optical fiber 14.

Each optical receiver 26 generates an electrical signal responsive to the analog modulation imparted on a respective wavelength λ. The electrical signals are processed by filter and level conversion modules 30, and applied to the demultiplexer input terminals 68. The channel selection signal CSSIG provided by one of the sequence logic modules 52B controls the switching of the electrical signals from the demultiplexer input terminals 68 to the demultiplexer output terminals 72 in a manner complementary to the switching achieved at the analog multiplexer 44. Consequently, each analog electrical signal ESIG applied to a multiplexer input terminal 56 is reproduced at the corresponding demultiplexer output terminal 72.

Figure 4:
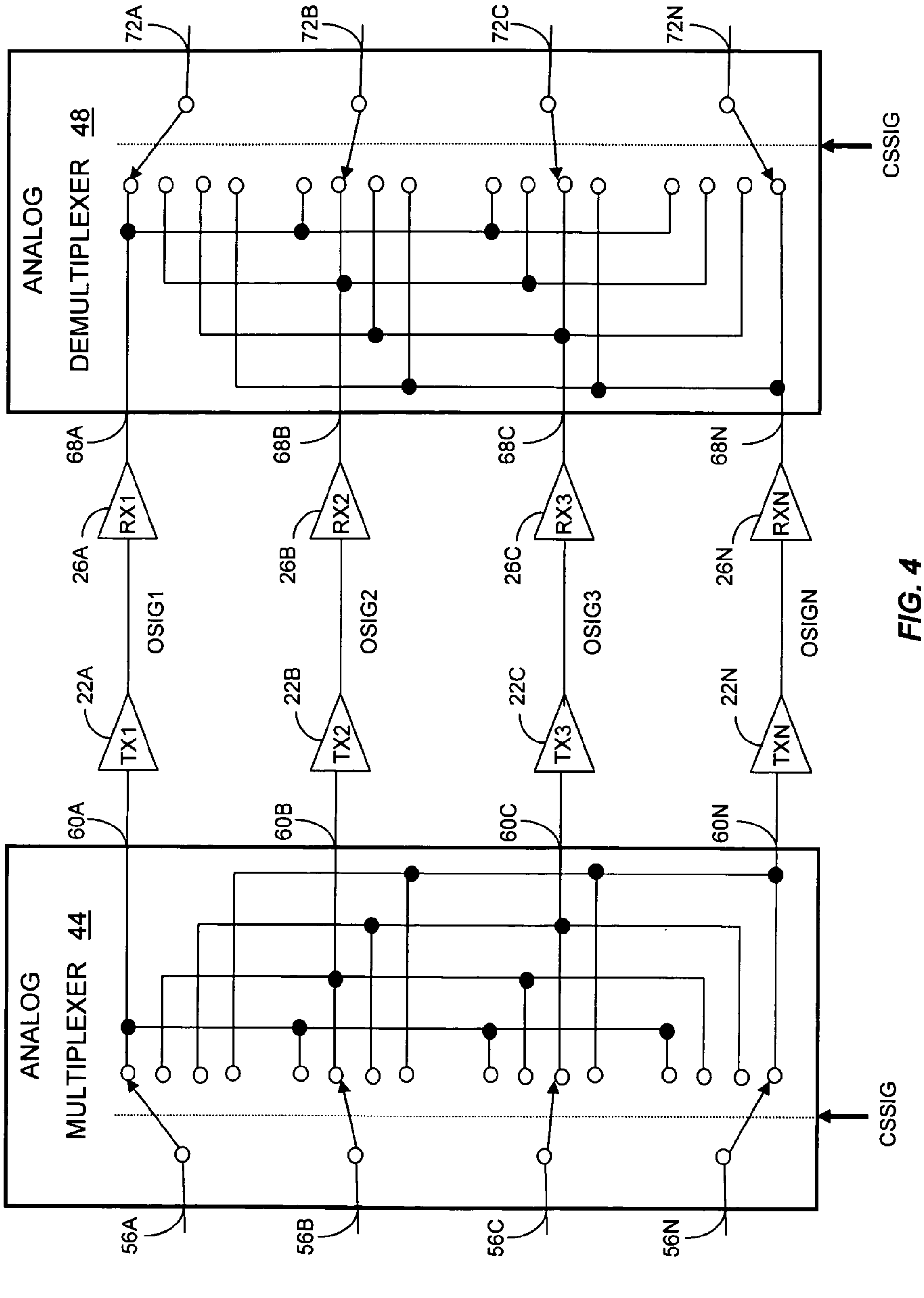
FIG. 4 is a high-level block diagram depicting the functionality of the analog multiplexer and analog demultiplexer of FIG. 3.

FIG. 4 shows a block diagram depicting the functionality of the analog multiplexer 44 and analog demultiplexer 48 of FIG. 3. For clarity, the filter and level conversion modules 18, 30 are not shown and only four of the 16 optical channels are depicted. In one embodiment, the analog multiplexer 44 and analog demultiplexer 48 are each implemented in an application specific integrated circuit (ASIC).

The channel selection signal CSSIG generated by the sequencer logic modules 52 is applied to each multiplexer 44, 48. Synchronization of the application channel selection signal CSSIG at the multiplexer 44 and the demultiplexer 48 ensures that the signal switching is synchronized. As a result, the mapping of the multiplexer input terminals 56 to the multiplexer output terminals 60 is the same as the mapping of the demultiplexer output terminals 72 to the demultiplexer input terminals 68. Consequently, an analog electrical signal ESIG applied at a multiplexer input terminal 56 is reproduced at the matching demultiplexer output terminal 72.

Figure 5:
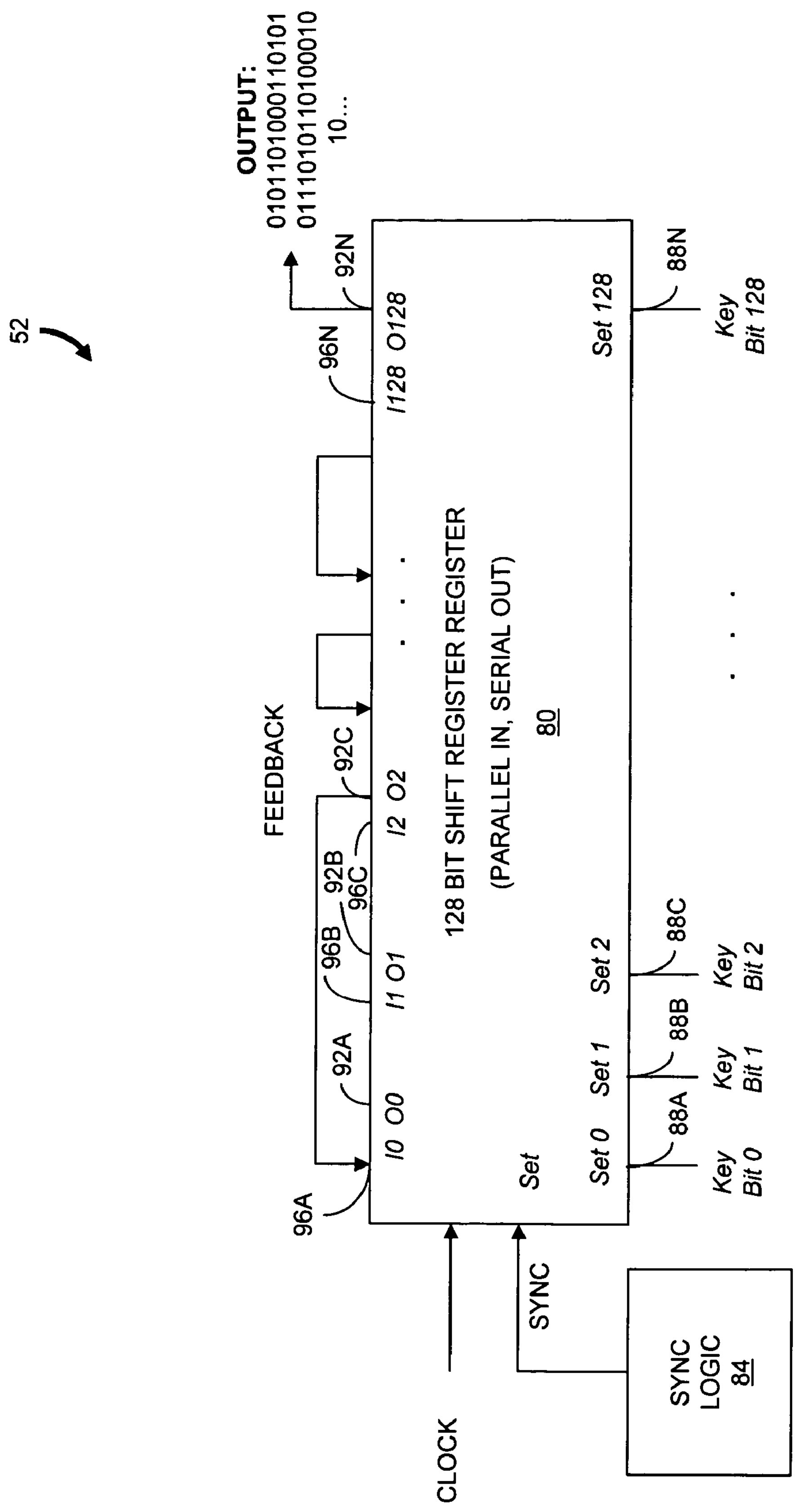
FIG. 5 is a high-level block diagram showing a sequencer logic module in accordance with an embodiment of a secure DWDM optical system of the present invention.

Ideally, the scrambling of the analog electrical signals in wavelength and time occurs in an unpredictable and unrepeatable manner. FIG. 5 shows one of the sequencer logic modules 52 used for pseudorandom scrambling according to one embodiment of a secure DWDM optical system of the invention. The sequencer logic module 52 includes a 128 bit shift register 80 in communication with a synchronization module 84. The sequencer logic module 52 is configured for parallel in and serial out operation, and includes 128 set terminals 88 to receive a 128 bit secret key.

The initial state of the shift register 80 is set according to a 128 bit secret key applied to the input set terminals 88. Each synchronization modules 84 supplies a synchronization signal SYNC to the associated shift register 80 to ensure that the analog multiplexer 44 and the analog demultiplexer 48 receive the channel selection signal CSSIG at the same time. More specifically, the synchronization modules 84 ensure that the stream of digits generated by the shift registers 80 starts at the same sequence. Synchronization can be achieved by sending a known sequence over all wavelengths, for example, by sending a constant frequency analog signal over all wavelengths. Detecting the constant frequency analog signal at the opposite synchronization module 84 would restart the synchronization of the bit stream according to the 128 bit secret key.

An external timing source provides a timing signal CLOCK to the shift register 80. The frequency of the timing signal CLOCK is selected so that the period of repetition is great enough that an attacker cannot take advantage of the repeatability of the channel selection signal CSSIG. Some of the output terminals 92 of the shift register 80 are configured to feedback to input terminals 96 to create the pseudorandom output bit stream CSSIG.

In other embodiments, shift registers and secret keys of other lengths are used. For example, a 256 bit shift register provides a longer period without repetition if the frequency of the timing signal CLOCK remains unchanged. The length of the secret key should be sufficiently great so that the probability that an attacker can guess or otherwise generate the secret key even with significant computational power is negligible.

A limited number of the output terminals 92 are used to select the time sequence and to select the wavelength. For example, a sequence of eight bits can be used with three of the bits controlling the time sequence and the other five bits controlling the wavelength selection. Other bit configurations are possible. The sequence is set with a 128 bit secret key shared between the two sequencer logic modules 52. The potential attacker has no way of setting how the shift register output begins as the shift register output appears as a random set of ones and zeroes.

The 128 bit secret key is made available to both ends of the optical link. The synchronization logic modules 84 ensure that the analog multiplexer 44 and analog demultiplexer 48 are synchronized. The secret key can be shared in a variety of ways. For example, the secret key can be passed "out of band" via telephone communication, email and the like. Alternatively, a password can be sent and used with a hash function to generate the shared key. In another example, the shared key is hardwired into each sequencer logic module 52.

A cryptographic key exchange can be used implement the shared key. For example, a Diffie-Hellman technique can be employed so that a secret key is shared without direct transmission of the secret key. According to this technique, a private and a public key are generated at or provided to each sequencer logic module 52 according to a specified protocol. The public keys are exchanged between the two sequencer logic modules 52. Independent calculations are performed at each module 52 using the retained private key and the received public key. The results of the two calculations are identical and represent the shared key applied to the shift registers 80.

While the invention has been shown and described with reference to specific embodiments, it should be understood by those skilled in the art that various changes in form and detail may be made therein without departing from the spirit and scope of the invention.

What is claimed is:

1. A secure optical communications system for transmitting a plurality of analog signals comprising:

an optical link having a plurality of transmitters at a first end and a plurality of receivers at a second end, each transmitter configured to generate an analog optical signal at a respective one of a plurality of wavelengths in response to an analog electrical signal, and each receiver adapted to detect one of the analog optical signals at the respective wavelength;

an analog multiplexer having a plurality of multiplexer input terminals to accept one of the analog electrical signals and having a plurality of multiplexer output terminals each in communication with one of the transmitters;

an analog demultiplexer having a plurality of demultiplexer input terminals each in communication with one of the receivers and having a plurality of demultiplexer output terminals;

a first sequence logic module in communication with the analog multiplexer to provide a channel selection signal in response to a shared key; and a second sequence logic module in communication with the analog demultiplexer to provide the channel selection signal in response to the shared key, the channel selection signal controlling the switching of the multiplexer input terminals to the multiplexer output terminals and the switching of the demultiplexer input terminals to the demultiplexer output terminals, wherein the duration of a time interval between switching of the multiplexer input terminals to the multiplexer output terminals and the switching of the demultiplexer input terminals to the demultiplexer output terminals is pseudorandom and wherein each analog electrical signal provided at one of the multiplexer input terminals is reproduced at a respective one of the demultiplexer output terminals.

2. The secure optical communications system of claim 1 wherein the switching of the multiplexer input terminals to the multiplexer output terminals and the switching of the demultiplexer input terminals to the demultiplexer output terminals is a pseudorandom sequence.

3. The secure optical communications system of claim 1 wherein the optical link further comprises an optical fiber disposed between the first end and the second end.

4. A method for transmitting analog optical signals in a wavelength division multiplexing optical system, the method comprising:

selectively combining portions of analog signals from a plurality of analog signals over a plurality of optical channels in accordance with a channel selection signal, wherein each optical channel has a unique wavelength and the channel selection signal is defined by a shared key;

transmitting the combined portions of analog signals for each optical channel;

detecting the transmitted combined portions of analog signals for each optical channel; and selectively combining the portions of the detected combined portions of analog signals in accordance with the channel selection signal to reproduce the analog signals, wherein the selective combining before transmitting and the selective combining after detection is repeated for a plurality of time intervals, the duration of the time intervals varying according to a pseudorandom sequence.

5. The method of claim 4 wherein the selective combining before transmitting and the selective combining after detection is repeated for a plurality of time intervals according to a synchronized pseudorandom sequence.

6. The method of claim 4 further comprising generating the channel selection signal in response to a shared key.

* * * * *

UNITED STATES PATENT AND TRADEMARK OFFICE

CERTIFICATE OF CORRECTION

PATENT NO. : 7,609,968 B2
APPLICATION NO. : 11/153650
DATED : October 27, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1097 days.

Signed and Sealed this

Twelfth Day of October, 2010

David J. Kappos

*Director of the United States Patent and Trademark Office*